United States Patent Office 3,338,675
Patented Aug. 29, 1967

3,338,675
CLARIFICATION OF CONCENTRATED WET PROCESS PHOSPHORIC ACID
Richard Lapham Gilbert, Jr., Princeton, N.J., assignor to American Cyanamid Company, Stamford, Conn., a corporation of Maine
No Drawing. Filed Jan. 22, 1964, Ser. No. 339,349
6 Claims. (Cl. 23—165)

The present invention relates to the treatment of concentrated crude wet process phosphoric acid. More particularly, it relates to the treatment of concentrated crude wet process phosphoric acid of at least 54% $P_2O_5$ by the removal of iron and aluminum impurities therefrom.

Still more particularly, the invention is concerned with a novel process for minimizing post-precipitation in a concentrated phosphoric acid of about 54% $P_2O_5$ and containing from 0.75% to 2.5% by weight of iron and from 0.8% to 2.0% by weight of aluminum, all in the form of their oxides, which involves adding to said concentrated phosphoric acid at from about room temperature to about 180° F. from 0.3% to about 2% of an inorganic potassium salt, then aging said mixture from two to fourteen days and precipitating therefrom a complex aluminum iron phosphate, separating the precipitated complex from the resultant clarified phosphoric acid and, finally, recovering for storage or shipping the so-treated, substantially precipitate free, concentrated phosphoric acid.

It is well known that wet process phosphoric acid concentrated to 54% $P_2O_5$ or higher will deposit solids when stored. However, solids continue to precipitate out of solution for an indefinite period of time. In the main, it has been generally accepted that crude wet process concentrated phosphoric acid will contain precipitating solids. The solids have not been completely identified but these are generally classified as complex iron and aluminum phosphates. The phenomenon of continuing precipitation is known as post-precipitation because solids continue to precipitate even after the acid has been clarified one or more times. The phenomenon of post-precipitation is indeed a troublesome problem. This is because solids accumulate in storage tanks and must be subsequently removed, and, second, solids accumulate in tank cars which are used for shipping phosphoric acid. In the latter situation, it is particularly difficult to unload tank cars containing large quantities of sludge in their bottoms. A problem of cleaning such tank cars and of eliminating such waste of phosphatic materials arises. The problem of post-precipitation can be substantially eliminated when phosphate rock containing small amounts of iron and aluminum, usually less than 0.75% and 1.0%, respectively, is employed in the manufacture of phosphoric acid. However, a low iron and aluminum rock cannot always be obtained. High content iron and aluminum rock is more readily available and the latter type tends to yield a viscous product containing large amounts of dissolved iron and aluminum which indeed aggrevates the problem of post-precipitation. Consequently, if the amount of iron in crude phosphoric wet process acid can be reduced to a minimum, hopefully post-precipitation can also be minimized. Several methods have been proposed to reduce the iron and aluminum content of phosphoric acid as produced. Unfortunately, none has been wholly successful. The most successful method involves a process for the aging or settling of the acid for a number of days followed by clarification by means of either filtration or by centrifuging. This approach to the problem has the marked disadvantage that although some of the iron and aluminum may be removed, the metallic content of the resultant acid as manufactured varies widely. It is usually higher than desired, particularly when a rock with higher than normal iron content has been employed as a feed material in the manufacture of the acid.

It is a principal object of the invention to provide an improved method for utilizing low-grade high iron-content rock in preparing crude wet process concentrated phosphoric acid. It is a further object to provide a method whereby the iron content of wet process phosphoric acid can be reduced to such acceptable low limits that post-precipitation of iron-containing phosphates is minimized. Other objects and advantages will become apparent from a consideration of the following detailed description.

It has been unexpectedly discovered that the addition of a potassium salt to wet process phosphoric acid will produce an initial precipitate containing iron and aluminum complexes. Removal of the latter indicates that resultant phosphoric acid contains only small amounts of iron and aluminum phosphates and that minimal post-precipitation is observed thereafter. Although it is well known that iron and aluminum can be precipitated from phosphoric acid by partially neutralizing the phosphoric acid, for instance, by the addition of a base, such as potassium carbonate or potassium hydroxide, nonetheless, in the present procedure, neutralization of the phosphoric acid to any extent does not take place.

According to the process of the present invention, minimal, continuing- or post-precipitation of concentrated phosphoric acid of at least 54% $P_2O_5$ is realized when from 0.3% to about 2% of a potassium salt is added directly to the said concentrated phosphoric acid. A precipitate of a complex iron aluminum phosphate is observed after the mixture is allowed to age for from two to fourteen days at from room temperature to about 180° F. The precipitate is then removed and after analysis of the iron and aluminum contents remaining in the solution, it is observed that substantially all of the iron and aluminum has been removed from the solution.

In general, any commercially available wet process concentrated phosphoric acid containing at least 54% $P_2O_5$ can be employed. Usually, the iron content as iron oxide varies from about 0.75% to about 2.5% and the aluminum content from about 0.8% to about 2%. The acid can be prepared by evaporation techniques containing from about 28% to 32% or higher $P_2O_5$.

Advantageously, a wide variety of inorganic potassium salts may be utilized. Illustrative of the latter are potassium halides, such as potassium chloride, potassium bromide or potassium iodide, potassium phosphate, potassium nitrate or potassium sulfate.

In order to facilitate a further understanding of the invention, the following examples are presented primarily for the purpose of illustrating certain more specific details thereof. The examples are not to be deemed limitative of the invention except as defined in the claims. Unless otherwise noted, all parts are by weight.

EXAMPLE 1

A hot concentrated wet process phosphoric acid as obtained from an evaporator as manufactured and analyzing as 54% $P_2O_5$, 1.9% iron oxide and 0.9% aluminum oxide is centrifuged to remove undissolved impurities therefrom. The liquor is divided into three aliquot parts. One part is maintained as control. A second part is treated with a sufficient amount of a potassium sulfate to combine with the total iron and aluminum present in the crude acid. To the third portion, potassium sulfate is added in an amount equal to twice the amount of that added in the second portion. All the portions are held at room temperature while agitating and are then analyzed at intervals for aluminum oxide and iron oxide as indicated on Table I below.

Portions of the liquid mixture are withdrawn and solids are then filtered and analyzed or assayed. During the second day, the treated portions develop a heavy precipitate, and the untreated material is clear after four days. At the end of ten days, the tests are terminated and all the portions analyzed. The results are summarized in Table I below.

TABLE I

| Wet Process H₃PO₄ (54% P₂O₅) | Analysis as Percent Fe₂O₃ | | | | |
|---|---|---|---|---|---|
| | 0 days | 1 day | 2 days | 4 days | 10 days |
| Untreated | 1.76 | 1.75 | 1.77 | 1.76 | 1.75+0.01% K⁺ |
| 0.55% K⁺ added | 1.74 | 1.75 | 1.61 | 1.15 | 0.73+0.21% K⁺ |
| 1.1% K⁺ added | 1.74 | 1.74 | 1.60 | 1.15 | 0.67+0.58% K⁺ |

| | Analysis as Percent AlO₃ | | | | |
|---|---|---|---|---|---|
| Untreated | 0.95 | 1.01 | 1.02 | 1.01 | 1.01 |
| 0.55% K⁺ added | 0.95 | 0.99 | 0.95 | 0.89 | 0.84 |
| 1.1% K⁺ added | 0.93 | 1.02 | 0.97 | 0.89 | 0.82 |

From an examination of the data presented in Table I, it can be seen that with an equivalent of potassium (0.55% K⁺) as well as with twice the amount of potassium (1.1% K⁺), the amount of iron oxide remaining in the resultant phosphoric acid liquid is reduced approximately 200% or more after ten days. With such infinitestimal amounts of iron, precipitation either in storage tanks or tank cars has been markedly minimized.

Similar results are obtained employing potassium monohydrogen phosphate, potassium dihydrogen phosphate, potassium phosphate, potassium chloride, potassium iodide and potassium nitrate.

EXAMPLE 2

The procedure of Example 1 is repeated in every detail, except that both potassium and sodium ions are employed for purposes of comparison. In this example, it will be clearly seen that sodium ion cannot be considered equivalent for purposes of clarifying concentrated crude phosphoric acid.

The process of Example 1 is modified by utilizing 0.3% potassium ion and 0.3% sodium ion in the form of their corresponding sulfates. Each of the treated acids containing separately 0.3% potassium ion and 0.3% sodium ion is subjected to tumbling on a roller for eighteen hours. Resultant compositions are then allowed to stand for an additional three and one-half days and aliquot portions are assayed for iron oxide. The results obtained in these tests are presented in Table II below.

Table II

| Acid: | Analysis as percent Fe₂O₃ |
|---|---|
| 54% acid, untreated | 1.77 |
| 54% acid, 0.3% K⁺ added | 1.30 |
| 54% acid, 0.3% Na⁺ added | 1.75 |

It will be seen that the analysis of iron oxide utilizing 0.3% sodium ion after treatment shows 1.75%, whereas untreated acid contains 1.77%. Substantially no improvement occurs with respect to the use of sodium ion. Advantageously using 0.3% potassium ion, an improvement greater than 20% is observed utilizing such small amounts of potassium ion.

I claim:

1. In a process for obtaining minimal post-precipitation of concentrated wet process phosphoric acid of about 54% P₂O₅ and containing from about 0.75% to about 2.5% iron by weight and from about 0.8% to about 2.0% aluminum by weight, all in the form of their oxides, the improvement which comprises the steps of: adding at from room temperature to about 180° F. from about 0.3% to about 2% of a simple, inorganic potassium salt to said concentrated phosphoric acid of about 54% P₂O₅, said salt being selected from the group consisting of potassium sulfate, potassium nitrate, potassium phosphate, potassium dihydrogen phosphate and potassium chloride, aging said mixture from about two to fourteen days, precipitating aluminum and iron phosphate complexes, separating resultant clarified concentrated wet process phosphoric acid from said precipitated complexes, and recovering for storage or shipping, the so-treated, substantially precipitate-free, concentrated wet process phosphoric acid.

2. A process according to claim 1, in which the potassium salt is potassium sulfate.

3. A process according to claim 1, in which the potassium salt is potassium nitrate.

4. The process according to claim 1, in which the potassium salt is potassium phosphate.

5. The process according to claim 1, in which the potassium salt is potassium dihydrogen phosphate.

6. The process according to claim 1, in which the potassium salt is potassium chloride.

References Cited

UNITED STATES PATENTS 3,141,734 7/1964 Ihlinger _____ 23—165
3,259,458 7/1966 Petersen _____ 23—165

OSCAR R. VERTIZ, Primary Examiner.

O. F. CRUTCHFIELD, A. J. GREIF,
Assistant Examiners.